No. 759,183. PATENTED MAY 3, 1904.
B. G. LAMME.
METHOD OF UTILIZING SINGLE PHASE ALTERNATING CURRENT ENERGY.
APPLICATION FILED JULY 16, 1902.
NO MODEL. 2 SHEETS—SHEET 1.

No. 759,183. PATENTED MAY 3, 1904.
B. G. LAMME.
METHOD OF UTILIZING SINGLE PHASE ALTERNATING CURRENT ENERGY.
APPLICATION FILED JULY 16, 1902.
NO MODEL. 2 SHEETS—SHEET 2.

WITNESSES:
C. L. Belcher
Birney Hines

INVENTOR
Benjamin G. Lamme
BY
Wesley G. Carr
ATTORNEY.

No. 759,183. Patented May 3, 1904.

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

METHOD OF UTILIZING SINGLE-PHASE ALTERNATING-CURRENT ENERGY.

SPECIFICATION forming part of Letters Patent No. 759,183, dated May 3, 1904.

Original application filed December 26, 1901, Serial No. 87,316. Divided and this application filed July 16, 1902. Serial No. 115,802. (No model.)

*To all whom it may concern:*

Be it known that I, BENJAMIN G. LAMME, a citizen of the United States, and a resident of Pittsburg, in the county of Allegheny and State of Pennsylvania, have invented new and useful Improvements in Methods of Utilizing Single-Phase Alternating-Current Energy, of which the following is a specification, this application being a division of my application, Serial No. 87,316, filed December 26, 1901.

My invention relates, primarily, to a new system of utilizing the energy of single-phase alternating electric currents for the distribution of power.

It has heretofore been proposed from time to time to employ series-wound motors of the direct-current type in connection with a single-phase alternating current for generating power, and although numerous attempts have been made they have not, so far as I am aware, been successful to any such degree as to render them commercially satisfactory. Various difficulties have been encountered—such, for instance, as those which pertain to regulation, sparking at the brushes, heating of the motors, low efficiencies, &c.

My invention aims to so organize a system of circuits and construct and adapt it to a motor having many of the characteristics of an ordinary direct-current motor as to render it capable of being operated efficiently at varying speeds and of being controlled with facility and certainty and also to secure the advantage of alternating-current transmission, transformation, and distribution.

The invention involves novel features in the method of constructing and using the motor, the controlling apparatus, and circuits connected therewith, together with a recognition and utilization of certain fundamental laws governing the operation of apparatus of this character, whereby the motor is properly organized and proportioned and correlated to the source of energy, so that it will be adapted to commercial requirements.

In describing the invention it will be found convenient to first consider the principles which must be applied in order to produce efficient and serviceable motors of this character and then describe how a motor may be constructed embodying these principles. Reference will be had, primarily, to a motor of the so-called "series" type—that is to say, one in which the field-coils are connected in series with successive portions of the armature-coils through a commutator. Such a motor is the seat of three principal electromotive forces: ($a$) the electromotive force of self-induction in the field due to alternating magnetic flux acting through the field-turns, ($b$) the electromotive force of self-induction in the armature due to cross-induction from the armature through the poles, ($c$) the armature counter electromotive force due to rotation. There are other electromotive forces—such, for example, as that used in overcoming the resistance of the windings—which are of minor importance and which need not at present be referred to in detail. The electromotive force of self-induction of the field is due to the alternating magnetic flux acting through the field-turns and depends upon the induction per pole, the number of field-turns in series, and the rate of alternation. The electromotive force of self-induction of the armature is due to cross-induction from the armature through the poles and is dependent upon the construction of any given motor and may be modified in various ways, as will be presently pointed out. The armature counter electromotive force depends upon the number of armature-wires in series, the induction per pole, and the rate of revolution and is independent of the rate of alternation.

As the electromotive force of field self-induction and the armature counter electromotive force both depend upon the induction per pole, there is an intimate relation between them. This relation is a function of the speed, the windings, and the rate of alternation. The higher the speed and the lower the rate of alternation and the fewer the field-windings compared with the armature-windings the lower will be the ratio of the electromotive force of field self-induction to the armature counter electromotive force. As the current in the motor increases the field magnetic strength and the armature magnetic strength increase, and the torque is proportional to the product of these two strengths. If there is no magnetic saturation, the field strength will increase directly with the current, and the armature strength will also increase directly with the current, and consequently the torque will increase as the square of the current in the motor. This would be an ideal condition for railway-service, for instance. The increase in field magnetic strength, however, is accompanied in an unsaturated field by a proportional increase in electromotive force of field self-induction. Inasmuch as the resultant of all the electromotive forces is equal to the applied electromotive force, it follows that with a given applied electromotive force an increase of the electromotive force of self-induction would result in a diminution of the counter electromotive force of the motor, and consequently, since the counter electromotive force is diminished with increase of current and the electromotive force of self-induction is increasing, the speed, which is proportional to the counter electromotive force, must fall off at a greater rate than the induction increases. If the electromotive force of self-induction of the motor becomes relatively high compared with the counter electromotive force, the speed will fall very rapidly, and zero speed is reached when the electromotive force of self-induction is practically as large as the applied electromotive force. The greatest torque is developed at this point. If this torque is insufficient, means may be provided for so modifying the conditions that the desired torque may be obtained. If, on the other hand, the field magnetic strength be held at a constant value instead of increasing with the current, then the electromotive force of field self-induction will be constant, and the armature counter electromotive force will not fall off rapidly with increase of current unless the electromotive force of armature self-induction due to cross-induction is relatively large. If this be made small, then the armature counter electromotive force will be comparatively independent of changes in current.

Two cases have just been described, the first that in which the field magnetic strength increases in approximate proportion with the current and the second that in which the field magnetic strength is constant, and therefore independent of the strength of the current. The first case represents an ideal condition for certain operations—such, for instance, as those required in railway service; but it has its limitations in that the greatest torque which can be developed may be insufficient for the maximum requirements. In the second case the torque which can be developed is practically unlimited; but, on the other hand, the general characteristics of the motor may not be well adapted for the given conditions of operation. It is desirable, therefore, in certain cases to so design and proportion the motor as to combine some of the elements of both arrangements, and thus secure a motor which will through a certain range of working have a field magnetic strength approximately proportional to the current and yet be capable of developing the required maximum torque.

It has been pointed out that the limitation in the torque developed when the field magnetic strength increases in proportion to the current is due to the rapidly-increasing electromotive force of self-induction of the field as the current is increased, so that the electromotive force of self-induction soon becomes nearly equal to the applied electromotive force. It is desirable, therefore, to provide means for limiting the electromotive force of self-induction, so that it does not normally absorb an undue proportion of the applied electromotive force, and when a heavy torque is required the self-induction of the field shall not limit the current, but shall permit a sufficient current to flow to produce the required torque.

As the electromotive force due to cross-induction of the armature through the poles acts with the electromotive force of self-induction of the field in limiting the flow of current, it is desirable that this should also be kept within proper limits. It follows, therefore, that the electromotive force of self-induction of the motor as a whole in normal working should be relatively small with relation to the applied electromotive force and should also have a limiting value which is less than the applied electromotive force, even when the motor is operating under maximum conditions of torque.

The desired relatively low electromotive force of self-induction of the motor may be obtained by suitable general arrangements and proportions between the various elements of the motor, while the limiting value of this electromotive force of self-induction may be secured by means of special constructions of certain parts.

In order to determine the general proportions to be used for securing the relatively low electromotive force of self-induction, it is necessary to consider the general relations existing between the different elements within the motor itself and also between the motor and the conditions under which it is operated, such as the speed of the motor and the frequency or rate of alternation of the current supplied to the motor.

The electromotive force of self-induction of the field is generally much greater than the electromotive force of self-induction of the armature due to cross magnetic flux, so that special provision should be made for reducing the electromotive force of self-induction of the field.

The electromotive force of field self-induction is dependent, as already stated, upon the induction per pole, the number of field-turns in series, and the rate of alternation. The armature counter electromotive force is dependent upon the induction per pole, the armature-winding, and the rate of revolution. These relations may be expressed as follows: Electromotive force of self-induction of field equals alternations multiplied by field-turns in series multiplied by induction per pole multiplied by constant. The counter electromotive force of the armature equals revolutions multiplied by the number of armature-wires multiplied by induction per pole multiplied by constant.

The constants used are dependent upon the characteristics of the supply-circuit and upon the units in which the different terms are expressed, their values are determined in any given case according to well-established laws, and the armature-winding is assumed to be of the usual parallel type. We have, therefore, the following relation between the self-induction of the field and the counter electromotive force of the armature:

$$\frac{\text{Electromotive force of field self-induction}}{\text{Armature counter electromotive force}} = \frac{\text{Line alternations} \times \text{field-turns in series} \times \text{induction per pole}}{\text{Revolutions} \times \text{armature-wires} \times \text{induction per pole}} \times \text{constant}$$

or $$\frac{\text{Electromotive force of field self-induction}}{\text{Armature counter electromotive force}} = \frac{\text{Line alternations}}{\text{Poles} \times \text{revolutions}} \times \frac{\text{Field ampere-turns}}{\text{Armature ampere-turns}} \times \frac{\text{Constant}}{2}$$

The last equation is derived directly from the first, as armature-wires equals two multiplied by poles multiplied by armature-turns in series, and the amperes (the current from the supply-circuit) are introduced in both numerator and denominator. It may be observed that the field ampere-turns are equal to the field-turns in series times the amperes, and the armature ampere-turns are equal to the armature-turns in series times the amperes.

In a direct-current motor the armature alternations are equal to the product of the revolutions multiplied by the number of poles, and since this relation may be assumed to obtain in a series alternating-current motor the foregoing formula may be further simplified by substituting the term "armature alternations" for the term "poles multiplied by revolutions."

It has been pointed out that the electromotive force of self-induction of the motor should be relatively low as compared with the applied electromotive force, since the resultant of the self-induction of the motor and the counter electromotive force is approximately equal to the applied electromotive force, and it follows that the electromotive force of self-induction should be low in proportion to the counter electromotive force of the armature in normal working. The relation between the two is expressed in the foregoing formula, and it is now apparent what relations must hold between the elements of the motor itself and between the motor and the external conditions.

In order that the ratio between the electromotive force of field self-induction and the counter electromotive force of the armature may be low, it is necessary that the values of the terms in the numerator of the second number of the equation be made small with relation to the values of the terms of the denominator. Such a ratio is secured, on the one hand, by having a small number of line alternations, a large number of poles, and a high speed and by having a small number of field ampere-turns and a relatively large number of armature ampere-turns. The absolute values and the ratios between these several elements, which are admissible and suitable for practical design and operation will now be considered.

The ratio of field ampere-turns to the armature ampere-turns has generally a minimum value which is fixed by the proper operation of the motor itself. If the field ampere-turns are too small as compared with the armature ampere-turns, the magnetic field will be distorted and good commutation will be difficult. The minimum ratio of field ampere-turns to armature ampere-turns is dependent upon many factors in the design; but in general it may be said that this ratio should be greater than .5 and may sometimes be as high as .75. Therefore when definite limits have been assigned to two of the ratios in the last equation—namely, the ratio of electromotive force of field self-induction to armature counter electromotive force and the ratio of field ampere-turns to armature ampere-turns—then there is also a definite limit fixed for the remaining term in the equation—i. e., a definite relation between the alternations in the supply-circuit, the number of poles of the motor, and its rate of revolution, or, in other words, between the line alternations and the armature alternations.

It may be noted that an average working value for the last-mentioned ratio is approximately .625, and it has been found that the expression $\frac{\text{constant}}{2}$ in the foregoing formula closely approximates the reciprocal of .625—i. e., 1.6. It follows, therefore, that the last two ratios of the formula cancel out, leaving only the ratios of electromotive force of field self-induction to armature counter electromotive force and line alternations to armature alternations, for which definite limits are fixed, as hereinbefore pointed out.

With a given number of revolutions the number of poles must be directly proportional to the alternations in the supply-circuit. Thus, for instance, if an eight-pole seven-hundred-revolution motor of a certain capacity is required for two thousand alternations per minute three thousand alternations per minute will require a twelve-pole motor at seven hundred revolutions per minute.

The foregoing considerations indicate the conditions required for securing a relatively low electromotive force of self-induction of the field of the motor. It has been stated that a limiting value of the electromotive force of self-induction of the motor can be secured by suitably proportioning certain parts of the motor. A method of doing this will now be described.

The electromotive forces of field self-induction and armature self-induction may both be limited by special construction of the pole-pieces. For instance, slots or holes may be cut in the body of each of the field pole-pieces from end to end transversely to the direction of rotation, the amount of iron left at the back of the slots being that which is required for the desired induction. The teeth or narrow portions between the slots or holes are of such cross-section that the desired induction through them may be obtained. The slots or holes may be closed or nearly closed at the pole-faces, and usually this is preferred, as open slots increase the magnetizing power required in the field-winding, which in turn necessitates more electromotive force of field-turns and results in greater field self-induction.

The cross-section of iron in the poles is preferably such that but little magnetizing power is absorbed in addition to that required for the air-gap until the current exceeds the normal rated amperes of the motor. Beyond this normal current the teeth between the pole-slots rapidly approach saturation. In order to secure this result, the parts in which the cross-section of the magnetic circuit is reduced should be of comparatively short length, but should of course be worked at a high induction. It is not necessary or desirable to subject the whole yoke to a high induction, as the desired results can be obtained by having a short length of small cross-section, whereas if the whole yoke be subjected to a high induction the losses due to reversals in the core will be objectionably large and also the magnetic leakage into the surrounding frame and through the field-windings will be objectionable.

The electromotive force of self-induction of the armature which results from a cross-induction through the poles, in which the magnetic lines enter at one edge or side of the pole and pass through the core to the opposite edge or side, is also reduced and limited by the arrangement of slots or holes which has been described and which would not be obtained in the same degree if the whole yoke were saturated, provided the field-cores in the two cases required the same number of ampere-turns in the field for magnetizing them. The cross-induction of the armature is due to the magnetic flux which passes through the field-poles, the path for any given pole being through the teeth at one side, then across the slots and also across the pole back of the slots, and then along the teeth at the other side of the pole and back to the armature. The smaller the section of the teeth and the more highly they are saturated the less will be the cross-induction with a given current in the armature. As it is desired to have the induction in these teeth quite high, it is, as above pointed out, desirable to have the teeth as small as possible, and therefore the magnetic reluctance of the field-circuit is concentrated near the pole-face instead of being distributed through the whole yoke.

The total useful flux through the armature and field sets up no effective electromotive force of self-induction in the armature-windings, as it will add to the counter electromotive force at one part and subtract at another part of such winding; but the electromotive force set up by the cross-induction does not neutralize itself in the same way, and thus becomes an electromotive force of the same character as that set up in the field-windings.

The cross-flux from the armature may be further limited by the suitable interposition of a secondary circuit, if desired. For example, if a slot at the middle of the pole contain a conducting-plate or closed coil it will oppose the magnetic flow which would tend to cross the slot. If the ends of a conductor placed through the middle slot be connected with the outer frame of the machine at each end, or if the conductor be closed around the outside of the yoke, then the secondary circuit thus formed will oppose the flow of the cross-induction which tends to pass through the section of iron back of the slots.

The armature-winding of the motor is of the closed-coil type and is closed upon itself before being connected to the commutator, relatively high resistance leads being inserted between the winding and the respective commutator-bars.

As the magnetic field of the motor is alternating any short-circuited turn through which the magnetic flux from a field-pole passes will have a secondary current set up in it. By the well-known laws of the transformer the ampere-turns in such short-circuited secondary will approximate the ampere-turns in the primary winding, which is in this case the field-magnet winding. Certain coils of the armature-winding are short-circuited through the brushes when the adjacent commutator-bars, to which the ends of the coils are connected, are bridged by the brushes, and when the latter are located in neutral positions or without lead the short-circuited turns surround the paths of the magnetic flux and are therefore good secondary circuits, in which relatively large secondary currents are set up by induction. This is the principal cause of the excessive sparking in series motors of ordinary construction when it is attempted to operate them upon an alternating-current circuit. In order to obviate destructive sparking, the current in the short-circuited turns of the armature-coils should be limited to an amount materially less than what would normally flow. I have found that by inserting a definite amount of resistance in each of the leads between the closed winding and the commutator-bars it is possible to so limit the secondary current due to the alternating field-flux as to prevent injurious sparking. The working currents in the armature-winding will not pass through these resistances except at the bars in contact with the brushes, because the armature-winding is closed on itself inside or beyond the resistance-leads. Consequently the loss in the winding due to the introduction of the resistance can be relatively small, and when the armature is rotating this loss is distributed successively through all the resistances, thus making the average loss per resistance-lead very small. Various ways of introducing such a resistance will be described in connection with the accompanying drawings.

With a given current in the motor the turn of each armature-coil, which is short-circuited by a brush, will tend to have the same electromotive force set up in it irrespective of the electromotive force applied to the motor. Therefore the resistance in the leads may be such that the short-circuited current developed will be limited in amount, and, generally speaking, with full-load current in the motor the resistance should be such that the short-circuited current will not exceed, say, twice the value of the full-load current. The resistance in each short circuit will include the resistance of the turn itself plus the resistance of two of the leads plus also the resistance of the brush-holders and brushes.

As will appear from what has already been stated, the conditions for suitably low electromotive force of self-induction and for a proper ratio of field ampere-turns to armature ampere-turns practically determine the number of poles the motor should have with a given rate of alternation and speed. This motor will require a relatively larger number of poles as compared with direct-current motors of corresponding size. Moreover, the conditions of good commutation are that the armature-circuits of the motor be connected in parallel and that the number of turns between consecutive armature-bars be small. It follows, therefore, that the voltage of the motor is definitely limited, and it is found that the actual voltage is low relative to that for which direct-current motors may be wound—such, for example, as motors employed in ordinary railway-service. While this characteristic would be a serious limitation in connection with the distribution of energy for direct-current railway-motors, it is of minor consequence in connection with alternating-current motors, since transformers may be interposed between the supply-circuit and the motors which may be designed to receive practically any voltage from the line and to deliver any desired voltage to the motors.

In service a motor may require either a constant voltage or a variable voltage. For variable-speed work the variable voltage is usually desired. A variable voltage may be obtained by the introduction of resistance or self-induction into the circuit or preferably by means of a tranformer in which the ratio of transformation is suitably changed.

The several elements which are involved are the motor, the controller, the supply-circuit, and the transformer. The motor, as has been pointed out, has inherent limitations as to the voltage for which it can be wound which are independent of the transformers, the controller, and the voltage of the supply-circuit. The current and the voltage which can be most advantageously handled by the controller may be entirely different from those of the motor. For example, it may be advantageous to design the controller for one-third of the current and three times the voltage which are required by the motor. The line voltage may in turn be entirely too high to be introduced directly into the controller or the motor. It follows, therefore, that the voltage of the motor, the voltage of the controller, and the voltage of the supply-circuit and their respective currents, which may be most advantageously utilized, may be widely different. It is possible, however, by means of one or more transformers to operate a motor adapted to any voltage by a controller adapted to any voltage from a supply-circuit of any voltage.

It has been pointed out that the resultant of the electromotive force of self-induction of the motor and the counter electromotive force of the armature is approximately equal to the applied electromotive force; but the method of obtaining the resultant has not been stated. The two electromotive forces are not of like phase, but are in quadrature, so that their resultant cannot be found by addition, but must be determined either by calculation or by graphical construction. The resultant is equal to the square root of the sum of the squares of the two components and is therefore proportional to the hypotenuse of a right-angled triangle of which the base and the height are proportional, respectively, to the counter electromotive force of the armature and the electromotive force of self-induction of the motor. The power factor is the ratio between the counter electromotive force of the armature and the applied electromotive force, (the motor losses being neglected.)

With a given counter electromotive force the power factor will be greater the less the electromotive force of self-induction. If, therefore, the power factor is to exceed a given value with a given armature counter electromotive force, a definite limit must be placed upon the electromotive force of self-induction.

As the power factor expresses the relation between the actual current supplied and the current which is transformed into work, it is a very important element in an electric system for the delivering of power. The higher the power factor the less will be the current required and the less the size of generators and transmission-circuits, although the actual power required from the engine for delivering a given motor output is practically independent of the power factor. The actual energy required by a motor for delivering a given horse-power from which the efficiency is determined is a matter independent of the power factor. For example, if a motor develops ninety horse-power and requires one hundred horse-power from the supply-circuit the efficiency is ninety per cent. If, however, the product of the electromotive force and the current received from the circuit corresponds to one hundred and twenty horse-power instead of one hundred horse-power then the power factor is one hundred divided by one hundred and twenty, or 86.6 per cent., and the apparent efficiency is ninety divided by one hundred and twenty, or seventy-five per cent.

As has been pointed out, the amount by which the apparent power from the circuit exceeds the actual power depends upon the electromotive force of self-induction of the motor, and it is primarily for the purpose of reducing the apparent energy required, so that it shall approximate the true energy, that it is essential to make the electromotive force of self-induction of the motor low.

In the accompanying drawings, Figs. 2 and 3 are detail sectional views of two of the combined resistance-leads and connectors between the armature-conductors and the commutator-segments. Figs. 4, 5, and 6 are detail views illustrating modified arrangements of resistance-leads for connecting the armature-conductors with the commutator-segments. Figs. 7, 8, and 9 are detail views of different forms of field-magnet-core construction.

While my invention is not limited to the use of motors having specific dimensions as a whole or as regards its several parts or to the use of specific materials and relative arrangements and is not restricted to any specific service, I have for convenience of disclosure illustrated a motor adapted for use in propelling railway-vehicles which has been designed for practical service and has been operated under such conditions and for such periods of time as to satisfactorily demonstrate that as regards efficiency of operation and freedom from injurious sparking and other deteriorating defects it is fully equal to, if not better than, the best examples of direct-current motors of like capacity which have been employed in practical service. The motor hereinafter illustrated and described therefore exemplifies the several principles of my invention in the best form in which I have thus far been able to present them; but in presenting these several features I do not intend to exclude from the scope of my invention any variations or modifications which may hereinafter be devised and adopted, except in so far as the description and the claims may expressly exclude such variations and modifications.

As regards the uses to which the invention may be applied I desire it to be also understood that the motor may be utilized in any service where it is desirable to start a motor under load and where more or less wide variations in speed and a proper rate of acceleration from zero to maximum speed are desired. It will also be understood that the machine may be useful as a booster of electromotive force in a single-phase alternating-current circuit when properly connected and driven by mechanical power, and it is therefore my intention to cover the invention as applied to such use, as well as to the transformation of electrical into mechanical energy.

Figure 1:
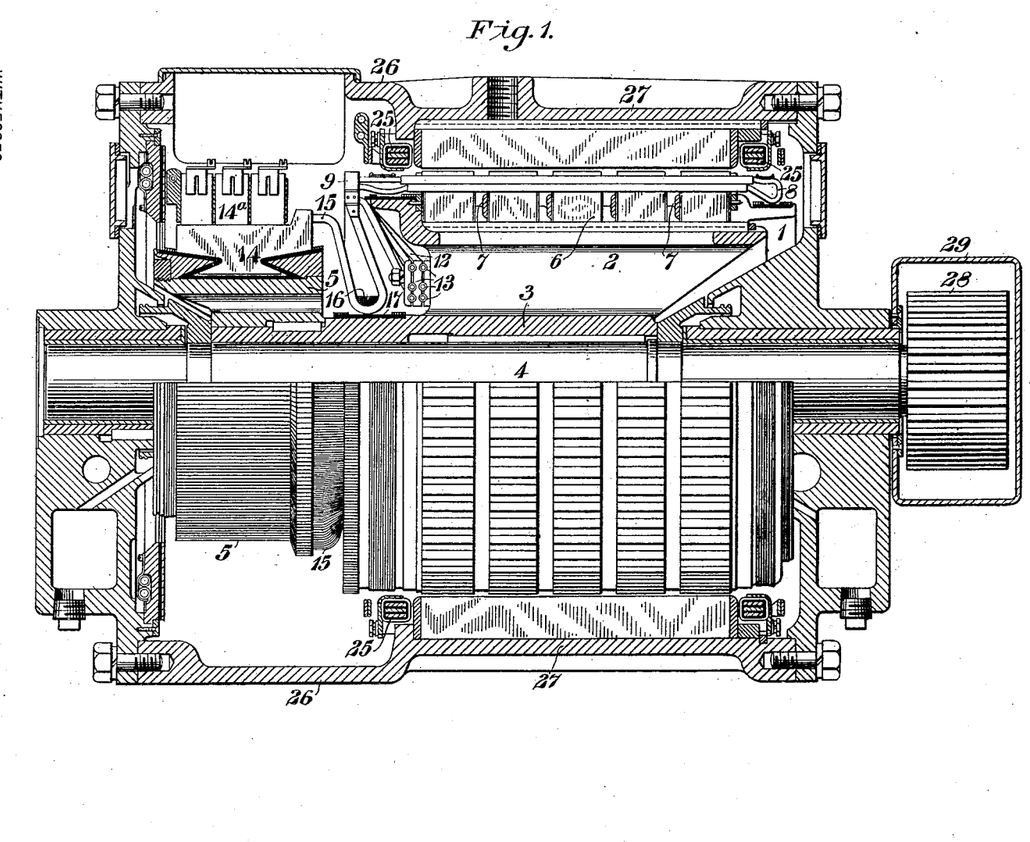
Figure 1 is a view, partially in side elevation and partially in longitudinal section, of a motor constructed in accordance with my invention.

As here shown, the armature 1 comprises a skeleton open-work frame or spider 2, the hub 3 of which is in the form of a sleeve mounted upon and suitably keyed to a shaft 4, this sleeve being extended at one end to receive a commutator-cylinder 5, which is also suitably keyed to it. The core 6 of the armature is built up in the usual manner of thin plates of laminæ properly spaced apart at intervals by ventilating-spacers 7 and provided with slots, which in the present case are seventy-two in number, in which are mounted the insulated conductors 8, constituting the coils of the armature-winding. These coils or conductors, as shown, are of strap-copper, the turns of which are located side by side in the slots, forming three separate coils, which span the core from the first to the ninth slot, and so on around the core. The coils are properly joined together at one end of the armature by means of suitable connectors 9 and 10, so as to form a closed parallel winding. The connectors 10 are provided with sockets 11, in which are fastened the outer ends of suitable connecting wires or strips 12, the inner ends of which are connected to conducting-rings 13, that are suitably supported at one end of the armature-spider, as indicated in Fig. 1. These rings, as shown, are six in number and are severally connected, by means of the strips 12 and connectors 10, to four points of equal potential in the winding, so as to equalize the magnetic circuits in the machine, substantially as set forth in Patent No. 573,009, granted to the Westinghouse Electric & Manufacturing Company December 15, 1896, upon an application filed by me. It will be seen that by this arrangement the armature-winding is closed and connected to the balancing-rings inside of the connections made to the commutator-segments.

For the purpose of reducing the secondary currents that are generated by the alternating magnetic field in the coils, which are short-circuited at the brushes to substantially non-sparking limits, I join the connectors 9 and 10 to the several commutator-bars 14 by means of relatively high resistance-leads 15, there being in the present case two hundred and sixteen commutator-bars and the same number of leads. As employed by me these leads are in the form of strips of German silver, and their dimensions are accurately determined in view of the specific resistance of the material, so as to reduce the secondary currents above referred to to the desired limits, and the form and arrangement of the leads are also such as to be properly accommodated by the space available and so as to be properly ventilated and securely supported independently of each other. The commutator-brushes 14$^a$ are arranged in sets in the holders or arms, and in the present instance the arms or holders are eight in number. The brushes and arms may be of usual materials and construction and connected in the usual manner to properly coöperate with the commutator-cylinder and the supply-circuit.

As indicated in Fig. 1, the leads 15 are bent into substantially the form of U-shaped loops, the inner ends of which are held in place by means of a suitable winding 16, an insulating-band 17 being interposed between the leads and the sleeve 3 of the armature-spider.

Figures 2, 3, 4, 5, 7, 8, 9:
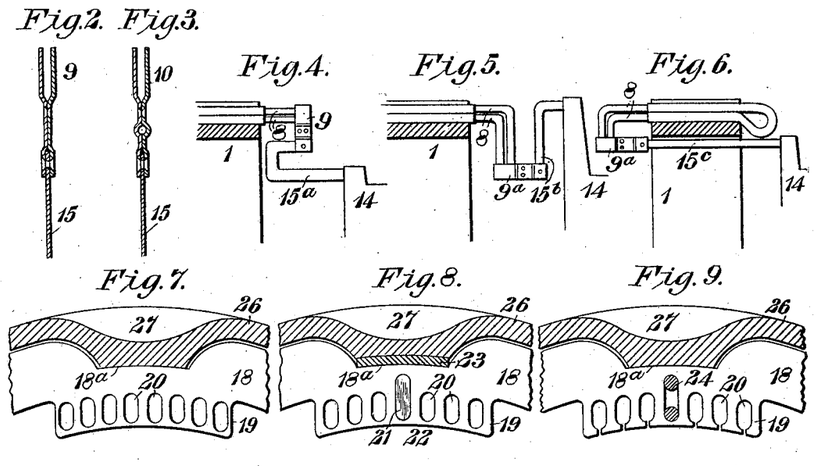
Figure 10:
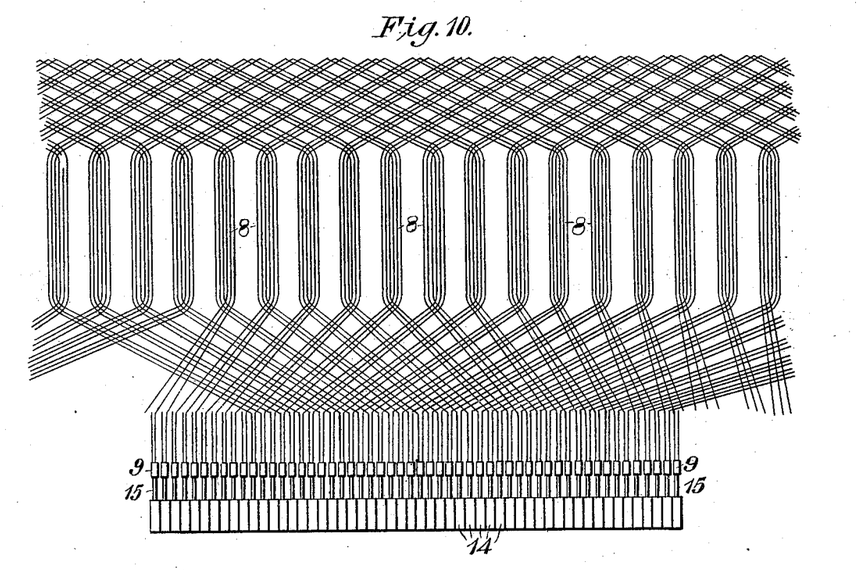
Fig. 10 is a diagrammatic development of a portion of the armature-winding and connections between the same and the commutator-segments.

As illustrated in Fig. 4, the resistance-leads 15$^a$ are shown as having a substantially U-shaped form, one arm of which extends beyond the other for connection to the commutator-bar and the two arms of which are approximately parallel to the armature-axis.

In Fig. 5 the resistance-leads 15$^b$ are shown as having each a main body portion substantially perpendicular to the armature-axis and an outer end which extends approximately at right angles to the body portion for connection to the commutator-bar. In this case the ends of the armature-conductors project inwardly approximately parallel to the body portions of the leads for connection to the connectors 9$^a$, which are also substantially at right angles to the body portions of the resistance-leads.

In Fig. 6 the resistance-leads 15$^c$ are connected to the ends of the armature-conductors at the end opposite the commutator and project through the spider to the commutator end substantially parallel to the axis of the armature. Other forms and arrangements of resistance-leads may perhaps be devised which will be adapted for the purpose. Those I have shown are such as I have been able to devise to most satisfactorily provide the necessary resistance and at the same time be economically and safely disposed in the available space in the motor.

As has already been pointed out, the number of field-magnet poles of the motor must be directly proportional to the rate of current alternation in the supply-circuit, and other conditions which have been heretofore pointed out in detail render it desirable and, in fact, necessary for successful operation that the rate of line alternations shall be low and that the rate of armature alternations shall be relatively high. The motor here illustrated and described was designed for a frequency of two thousand line alternations per minute, and the motor which is adapted to this number of alternations and the other conditions has eight field-magnet poles.

The field-magnet core 18 is in the form of a hollow cylinder and is built up of thin plates or laminæ, the laminated construction being necessary by reason of the fact that the magnetic flux due to the field-magnet winding is alternating.

The polar projections or pole-pieces 19 are provided with holes or perforations 20, extending through the same transversely to the direction of armature rotation and located in close proximity to the ends of the polar projections or pole-pieces, and the depth of the body portion of the core is reduced at the rear of each polar projection, as shown at 18$^a$ in Figs. 7, 8, and 9, in order to aid in reducing the cross-magnetization, and consequently the electromotive force, of armature self-induction. The slots 20 are made comparatively shallow in order to keep the iron loss low and at the same time to insure the desired saturation of the adjacent iron when the current materially exceeds the rated amperes of the motor. These slots may be entirely closed at the pole-faces, as indicated in Figs. 7 and 8, or they may have narrow openings, as shown in Fig. 9; but in every case where open slots are employed the openings should be small.

As shown in Fig. 7, there are eight of the holes 20, which, as above stated, are of such dimensions and so spaced as to provide a cross-section of metal between them which will become quickly saturated when the current in the field-magnet windings materially exceeds the rated amperes for which the motor is designed.

In Fig. 8 are shown six holes 20, and at approximately the middle of the pole-piece is a hole 21, which is of materially greater depth than the holes 20. In this hole 21 is located a bar or plate 22 of copper or other good conducting material for the purpose of serving as a closed secondary circuit to reduce the electromotive force of armature self-induction due to the cross-magnetization. In Fig. 8 is shown a plate 23, of copper or other good conducting material, which also acts as a secondary closed circuit to oppose any cross-magnetizing flux which tends to pass outside of the core 18 of the field-magnet.

In Fig. 9 the construction is the same as that shown in Fig. 8, except that a single turn 24 of wire, constituting a closed coil, is placed in the middle slot 21 instead of the bar or plate 22, and the plate 23 is omitted. Other forms of conductors suitably disposed to act as secondaries, and thus oppose the cross-magnetizing flux, might be employed, if desired, those shown being set forth merely as examples that I have found well adapted for the purpose.

The field-magnet winding 25 is here shown as comprising eight coils of strap-copper bent edgewise and connected in series and so insulated and supported as to perform the functions desired and at the same time be effectively insulated and occupy a minimum amount of space.

In the present case the winding comprises twenty turns, one half of the coils having three turns and the other half having two turns, and the coils of the two sets are alternately disposed around the core. A greater number of turns may be employed, if desired, provided they are so connected that the number of turns in series does not materially exceed that specified above.

The field-magnet core and coils are mounted in a casing 26, which is provided with extensions at its ends to inclose also the armature and commutator. As shown, this casing projects inwardly at the backs of the pole-pieces to constitute supports for the core 18 and is correspondingly hollowed out as regards its exterior, as indicated at 27, so as to lessen the weight of the structure. This form may be varied from what is shown, if desired, and the points of support between the core and the casing may be otherwise located. The casing may also be made of open-work skeleton construction, if desired, since its office is mainly that of a support for the field-magnet.

The motor here shown and described was designed for a maximum electromotive force of two hundred and fifty volts and a normal current of four hundred and fifty amperes at two thousand alternations per minute to operate at a speed of seven hundred revolutions per minute and to normally develop one-hundred-horse power.

The shaft 24 is shown as provided with a pinion 28, surrounded by a casing 29, which may also contain the power-transmitting gear with which the pinion 28 meshes, as is usual in railway-motors.

It is to be understood that the illustration and description of a motor adapted to one class of service does not restrict the invention to motors for that service only.

I claim as my invention—

1. The method of designing a series, alternating-current motor, which consists in first establishing the relation which must exist between the electromotive force of field self-induction and the armature counter electromotive force, between the alternations and product of poles and revolutions and between the field ampere-turns and the armature ampere-turns in order that the motor may have a given power factor and may have suitable proportions for commutation, and then providing such cross-section of magnetic circuits and such windings of conductors as are necessary for the electrical energy which is to be transformed into mechanical power.

2. The method of constructing a series, alternating-current motor that shall have a predetermined power factor, which consists in first providing such a relation between the electromotive force of self-induction of the field and the counter electromotive force of the armature by reference to the predetermined power factor, that the actual current transmitted shall exceed the current effectively used by only a predetermined, permissible amount; second, providing such a relation between field ampere-turns and armature ampere-turns that with a permissible electromotive force of field self-induction there shall be sufficient field magnetic strength to prevent an undue distortion of the magnetic field of force, and then providing such a relation between the rate of alternations and the number of poles, that with a predetermined rate of revolution the motor shall operate with the predetermined power factor.

3. The method of adapting a series, alternating-current motor to a circuit having a given rate of current alternation, which consists in making the product of the number of poles by the revolutions such that with a given ratio between the ampere-turns in the field and in the armature, the resulting electromotive force of self-induction of the field will bear a ratio to the counter electromotive force which will not exceed a predetermined value, and then determining the windings necessary for the power to be delivered.

4. The method of adapting a series, alternating-current motor to a circuit having a given rate of current alternation, which consists in making the product of the number of poles by the revolutions such that when the ratio between the electromotive force of self-induction of the motor and the counter electromotive force of the armature insures a desired power factor, the ratio between the field ampere-turns and the armature ampere-turns will be suitable for good commutation.

5. The method of adapting a series, alternating-current motor to a given rate of current alternation, which consists in providing a ratio between the armature ampere-turns and the field ampere-turns which, with a given product of poles by revolutions, will render the ratio of electromotive force of field self-induction to armature counter electromotive force such that the power factor will not fall below a given limit.

6. The method of adapting a series, alternating-current motor to a circuit of a given rate of current alternation, which consists in so proportioning the motor that with a given ratio of electromotive force of self-induction to counter electromotive force, the ratio of the field ampere-turns to the armature ampere-turns will have a definite value and the product of the poles by the revolutions will sustain a definite relation.

7. The method of adapting a series, alternating-current motor having a given product of poles by revolutions and a given number of armature ampere-turns, to a circuit having a given rate of current alternation, which consists in providing such a number of field ampere-turns that the ratio of the electromotive force of field self-induction to the armature counter electromotive force shall have a value which insures a power factor that exceeds a predetermined limit.

8. The method of adapting the construction of a series, alternating-current motor to given conditions of supply-current frequency and armature speed, which consists in giving to the electromotive force of field self-induction a ratio of less than fifty per cent. with respect to the counter electromotive force of the armature by properly adjusting the field and armature windings with respect to each other and the number of field-poles.

In testimony whereof I have hereunto subscribed my name this 15th day of July, 1902.

BENJ. G. LAMME.

Witnesses:
JAMES B. YOUNG,
BIRNEY HINES.